United States Patent [19]

Tippmann et al.

[11] 4,112,787
[45] Sep. 12, 1978

[54] EPICYCLIC FRICTION TRANSMISSION WITH TORQUE-DEPENDENT PRESSURE-EXERTING DEVICE

[75] Inventors: Heinrich Tippmann; Wolfgang Huber, both of Münich, Germany

[73] Assignee: ITT Industries, Inc., New York, N.Y.

[21] Appl. No.: 749,687

[22] Filed: Dec. 13, 1976

[51] Int. Cl.² .................. F16H 13/06; F16H 15/56
[52] U.S. Cl. .................................... 74/798; 74/755
[58] Field of Search .................. 74/798, 804, 755

[56] References Cited

U.S. PATENT DOCUMENTS

| 3,324,746 | 6/1967 | Kari | 74/804 X |
| 3,381,549 | 5/1968 | Hirakawa | 74/804 |
| 3,478,623 | 11/1969 | Noguchi | 74/798 |

FOREIGN PATENT DOCUMENTS

| 845,252 | 7/1949 | Fed. Rep. of Germany | 74/804 |
| 2,458,762 | 6/1976 | Fed. Rep. of Germany | 74/798 |

*Primary Examiner*—Samuel Scott
*Assistant Examiner*—Lance W. Chandler
*Attorney, Agent, or Firm*—William T. O'Neil

[57] ABSTRACT

A torque-dependent, mechanical pressure-exerting device for friction gears with a planet wheel, particularly for steplessly adjustable gears, wherein for each direction of rotation, the torque between the drive shaft and the planet wheel is resolved into an approximately radially acting contact pressure and an approximately tangentially acting circumferential force via a pair of curves (cam and counterpart), with one element of the pair of curves disposed on the drive shaft, wherein the other element of the curve pair is disposed on the shaft of the planet wheel.

6 Claims, 3 Drawing Figures

EPICYCLIC FRICTION TRANSMISSION WITH TORQUE-DEPENDENT PRESSURE-EXERTING DEVICE

BACKGROUND OF THE INVENTION

The purpose of epicyclic trains is, inter alia, to permit extremely large reduction ratios to be achieved with few wheels. With steplessly adjustable friction gears, as the name implies, it is possible to select different output speeds at constant input speeds, or vice versa.

German Pat. No. 374,112 describes a steplessly adjustable friction transmission wherein the planet wheels have two crowned running surfaces and are forced against the inside surfaces of two outside sun wheels by centrifugal force only. As a result, extremely high driving speeds are necessary to obtain acceptable output torques. Also, there is no advantageous utilization of the resolution of forces by wedging action. In the various embodiments, the transmission ratio is changed not by shifting the shafts of the planet wheels parallel to the running surfaces, but by tilting these shafts, so the crowned running surfaces are indispensable. This manner of adjustment is sufficient only for contact pressures caused by centrifugal forces; it is not suited for trains with only one planet wheel whose shaft is shifted parallel to the running surface.

German Auslegeschrift (DT-AS) No. 1,231,080 shows such a steplessly adjustable epicyclic friction gear wherein the single planet wheel is radially shiftable and has conical friction surfaces, but there the necessary contact pressure must be exerted also by springs, hydraulic and/or electrical devices, i.e., not simply positively mechanically as a function of the speed of the input shaft.

Mechanical, torque-dependent pressure-exerting devices are known in the art. British Pat. No. 1,283,375, for example, discloses a mechanical pressure-exerting device wherein a cam with curves acting in both directions of rotation is disposed on the drive shaft of the gearing. According to the direction of rotation, one of these cam curves presses on the shaft of an intermediate wheel which rolls around the inside of a planet wheel, the two wheels being maintained in frictional driving contact with each other. The planet wheel, in turn, rotates in a cylindrical outer ring, the planet wheel and the outer ring being in frictional driving contact with each other. Such high-reduction-ratio transmissions are usually driven by high-speed electric motors with correspondingly low torque. The arrangement with an intermediate wheel turns out to be expensive and possibly unreliable because the speed of the intermediate wheel is very high. This may also result in an unduly high noise level.

SUMMARY OF THE INVENTION

The general object of the invention may be said to be in making the pressure-exerting device simple in design and reliable in operation.

This object is achieved by the measures set forth in the characterizing clause of claim 1. With the invention, it is not necessary to interpose any additional rollers, so the number of component parts is kept small.

In the case of a known pressure-exerting device for a friction wheel (German Pat. No. 532,053), the pressure-exerting cams are disposed directly on the drive shaft, whereby small lever arms are obtained. However, several cams distributed along the circumference act simultaneously on suitable intermediate bodies acting as clamping elements, such as balls, rollers, or wedge-shaped elements. These transmit the resultant pressure on to the cylindrical inside surface of an outer ring by being maintained in frictional driving contact with this surface. Since, as mentioned above, several cams are distributed along the circumference, the radial forces cancel out with respect to the outer ring, and the latter is urged into a centric position. As only the smooth, cylindrical inside surface of the outer ring is present between the intermediate bodies and the outer ring, the circumferential force transmissible by this pressure exerting device cannot exceed the value $F \times \mu$ ($F$ = contact pressure, $\mu$ = coefficient of friction). Furthermore, the intermediate bodies are indispensable in this known pressure-exerting device because the counterpart (outer ring) has no areas where the forces of the pressure-exerting cams disposed on the drive shaft can be applied. An arrangement with pressure-exerting cams on the outer ring has, of course, no cams on the inner ring, and the latter has a plain cylindrical surface.

Pressure-exerting devices which convert the circumferential force of a shaft rotating about its axis, wholly or in part, into an axial contact pressure have been known for some time, too, and are described in German Auslegeschrift (DT-AS) No. 2,219,238, for example. This type of pressure-exerting device, too, requires at least two parallel cams to generate centrally acting axial forces. It is not suitable for use in epicyclic friction gears.

BRIEF DESCRIPTION OF THE DRAWINGS

The invention will now be described in more detail with reference to the accompanying drawings, showing, by way of example, preferred embodiments of the invention, and in which.

DESCRIPTIONS OF THE PREFERRED EMBODIMENTS

Figure 1:
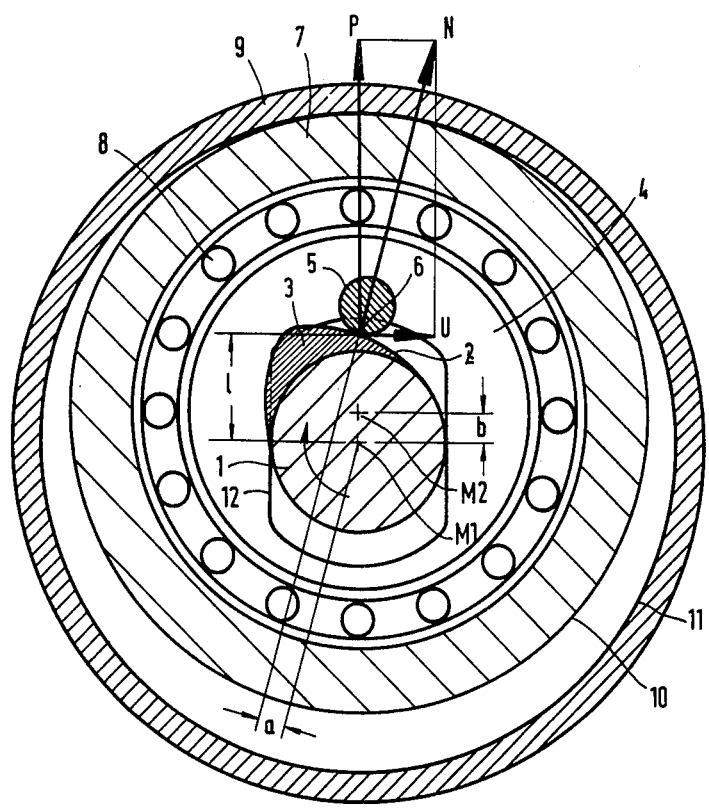
FIG. 1 is a sectional view through a pressure-exerting device according to the invention wherein the cam is disposed on the drive shaft.

In FIG. 1, the driving torque is transmitted from a drive shaft 1 to the shaft 4 of a planet wheel 7 via a cam 3 having a surface curve 2. The cam 3 is symmetrical in shape and can thus be used for both directions of rotation. It is permanently connected or integral with the drive shaft 1. The curve 2 of the cam 3 preferably has the shape of a spiral. In the case of a logarithmic spiral, the helix angle is always the same, but approximate curves, which are easier to produce, are usable as well. Advantageously, the shaft 4 may have a hardened counterpart (cam engagement part) 5 to obtain mechanical efficiency. At the point of contact 6 between the curve and part 5, the input torque with the effective lever arm $a$ produces the resultant normal force N from the rotation of drive shaft 1. This force N may be resolved into a circumferential force U with lever arm $l$ and the radially outward contact pressure P having a zero effective with the lever arm. The force directions need not correspond exactly to the directions shown in the parallelograms of forces in FIGS. 1 and 2, but may be slightly different.

The contact pressure P forces the planet wheel 7, turning freely on the shaft 4 about a bearing 8, against the outer sun wheel 9, which is assumed to be fixed in this example. The drive shaft 1 and the outer sun wheel 9 have a common center M1. The circumferential force U causes the planet wheel 7 which has a center M2, to rotate about the center M1, offset by distance b, with the outer circumference 10 of the planet wheel 7 rolling on the inner circumference 11 of the fixed outer sun wheel 9.

The mathematical relationships determining the transmission ratio are readily analyzed according to known methods. For better axial stability of the shaft 4 on the drive shaft 1, lateral guide surfaces 12 may be provided.

The lever arm a, which determines the magnitude of the normal force N, is dependent on the helix angle of the cam curve 2 and on the length of the effective lever arm l. For self-retention reasons, there is a lower limit to the helix angle of the cam curve 2, so the lever arm l must be kept as small as possible to achieve a maximum normal force N and, thus, a maximum contact pressure P for the sliding contact between the planet wheel 7 and the outer sun wheel 9.

Figure 2:
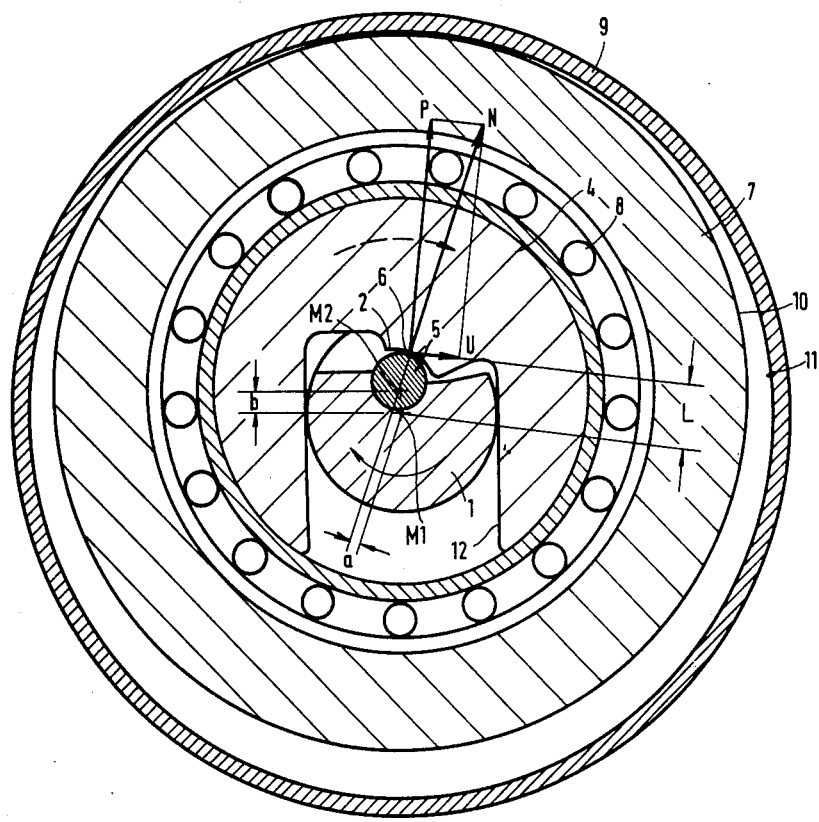
FIG. 2 is a section through a pressure-exerting device wherein part of the shaft of the planet wheel has the shape of a cam.

FIG. 2 shows how the lever arm l can be made even smaller if the diameter of the drive shaft 1 is kept to the minimum value still ensuring sufficient strength. In respect to the curve pair 2/5, the curve 2 and the counterpart 5 have been interchanged. The counterpart (cam engagement part) 5 is relatively easy to mount within the drive shaft 1, while the cam curve 2 forms part of the shaft 4 and can be easily manufactured by grinding with a formed wheel, for example. Other aspects of FIG. 2 are the same as their equivalents in FIG. 1.

The cam 3 of FIG. 1 may also form an integral part of the drive shaft 1 in a manner similar to FIG. 2, but this usually entails additional expense.

This described pressure-exerting device in either form is suitable for one and two stage friction transmissions with one planet wheel per plane of rotation.

When the effective diameter of at least one wheel (planet wheel and/or outer sun wheel) is changed, the counterpart 5 will shift along the curve 2, simultaneously re-orienting the drive shaft 1 relative to the shaft 4, until the planet wheel 7 and the outer sun wheel 9 are again in frictional driving contact with each other. Such a change in the diameter ratio also produces in a change in the transmission ratio. If the wheel diameter is varied steplessly, the transmission ratio will vary steplessly, too.

Figure 3:
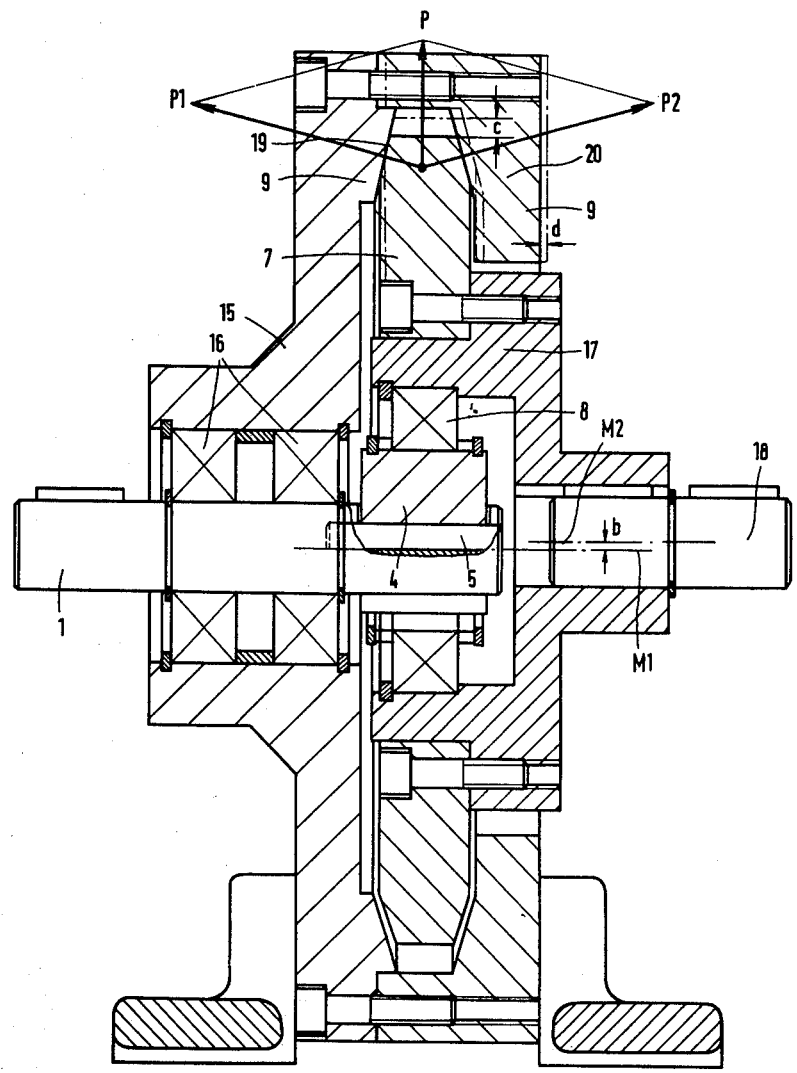
FIG. 3 shows, as an example of application, a friction gear with a planet wheel and a pressure-exerting device according to the invention in a sectional view.

FIG. 3 shows, as an example of application of the pressure-exerting device according to the invention, a single-stage transmission with a fixed outer sun wheel 9 in a sectional view. The drive shaft 1 is supported by two antifriction bearings 16 installed in the casing 15. The counterpart 5 is mounted in the drive shaft 1 and cooperates with the cam curve 2 (not visible in FIG. 3) ground into the shaft 4 as shown in FIG. 2. Between the bearing 8 and the planet wheel 7, a driven bell 17 with a driven shaft 18 is provided. The output drive is effected eccentrically according to the distance b between the two center lines M1 and M2. It can be changed back into a centric form in known manner, e.g. with universal joints, hollow articulated shaft couplings, or couplings compensating for the shaft offset. The fixed outer sun wheel 9 is of two-piece construction, and its left half forms part of the casing 15. To increase the contact pressure P, the latter was resolved into the two components P1 and P2 by means of conical frictional surfaces 19. If the portion 20 of the outer sun wheel 9 is made axially shiftable by means as disclosed, for example, in German Pat. No. 1,231,080 (not shown here), the planet wheel 7 will shift radially by the amount c when the portion 20 is shifted axially by the amount d. The effective diameter of the fixed outer sun wheel 9 thus changes by the amount 2c, and the transmission has thus been provided with a steplessly variable transmission ratio. In this example, the necessary axial shift between the planet wheel 7 and the drive shaft 1 takes place between the bearing 8 and the shaft 4.

To achieve a radial shift of the planet wheel 7 relative to the outer sun wheel 9, it is also possible to vary the effective width of the conical planet wheel 7 alternatively. The two approaches (varying the width of the outer sun wheel 9 and of the planet wheel 7) can also be combined.

Any unbalance can be compensated for in known manner by means of balance weights.

What is claimed is:

1. An epicyclic, friction type, mechanical transmission in which a planet wheel makes a friction contact with the larger diameter inside surface of a fixed sun wheel, said transmission having first and second independent shafts concentric with said sun wheel and said planet wheel, respectively, but having centers offset with respect to each other, the combination comprising:
    means for transmitting torque between said first and second shafts, said second shaft being mechanically fixed to said planet wheel, said means including the circumferential force produced by friction between said sun wheel inside surface and said planet wheel rolling eccentrically within said sun wheel;
    and means operative between said first shaft and said planet wheel including a cam surface associated with one of the two members consisting of said first shaft and said second shaft and a cam counterpart affixed to the other of said two members, said cam and counterparts being arranged to effectively resolve said torque couple into tangential and radially outward forces, said radially outward force being directed substantially along a line containing said offset shaft centers, the surface of said cam providing a wedging action such that the magnitude of said radially outward force is a direct function of the magnitude of said torque couple between said shafts.

2. Apparatus according to claim 1 in which said first shaft includes said cam and said second shaft includes said cam counterpart.

3. Apparatus according to claim 1 in which said second shaft includes said cam and said first shaft includes said cam counterpart.

4. Apparatus according to claim 2 in which said cam includes two slopes, one operative to contact said cam counterpart when said first shaft is the driver shaft and said second shaft is the output shaft, and the other being operative to contact said cam counterpart when said second shaft is the driver shaft and said first shaft is the output shaft.

5. Apparatus according to claim 3 in which said cam includes two slopes, one operative to contact said cam counterpart when said first shaft is the driver shaft and said second shaft is the output shaft, and the other being operative to contact said cam counterpart when said second shaft is the driver shaft and said first shaft is the output shaft.

6. Apparatus according to claim 1 in which said first shaft extends axially within said second shaft, said first and second shafts having substantially parallel axes, the shape of said groove in a plane normal to said axes being elongated in the general direction of said radially outward force to provide a lateral guide for said first shaft.

* * * * *